United States Patent
Schmidt et al.

(10) Patent No.: US 6,631,070 B2
(45) Date of Patent: Oct. 7, 2003

(54) CERAMIC CAPACITOR WITH CZT DIELECTRIC

(75) Inventors: Peter Schmidt, Aachen (DE); Detlev Hennings, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/169,347

(22) PCT Filed: Oct. 31, 2001

(86) PCT No.: PCT/EP01/12720

§ 371 (c)(1),
(2), (4) Date: Jul. 1, 2002

(87) PCT Pub. No.: WO02/037514

PCT Pub. Date: Oct. 5, 2002

(65) Prior Publication Data

US 2003/0002239 A1 Jan. 2, 2003

(30) Foreign Application Priority Data

Nov. 4, 2000 (DE) .......................................... 100 54 812

(51) Int. Cl.$^7$ ................................................. H01G 4/06

(52) U.S. Cl. .................... 361/321.2; 361/311; 501/138; 29/25.41

(58) Field of Search ........................... 361/321.2, 321.4, 361/311, 312; 29/25.41, 25.42; 501/134, 135, 136, 137, 138–139

(56) References Cited

U.S. PATENT DOCUMENTS

| 4,506,026 A | * | 3/1985 | Hodgkins et al. ............ 501/135 |
| 4,766,027 A | * | 8/1988 | Burn ........................... 428/210 |
| 4,879,261 A | * | 11/1989 | Burn ............................ 501/32 |
| 4,935,844 A | * | 6/1990 | Burn ........................ 361/321.5 |

OTHER PUBLICATIONS

Dynamic QOS Control Based on the QOS–Ticket Model (IEEE Proceedings of Multimedia '96, p. 78 to 85).

* cited by examiner

*Primary Examiner*—Anthony Dinkins
(74) *Attorney, Agent, or Firm*—Steven R. Biren

(57) ABSTRACT

The invention relates to a ceramic capacitor having at least two electrodes and a ceramic dielectric of a dielectric, ceramic preparation which is essentially composed of an oxide-ceramic dielectric substance and a sintering agent including zinc borate $Zn_4B_6O_{13}$.

6 Claims, 1 Drawing Sheet

CERAMIC CAPACITOR WITH CZT DIELECTRIC

Figure 1:
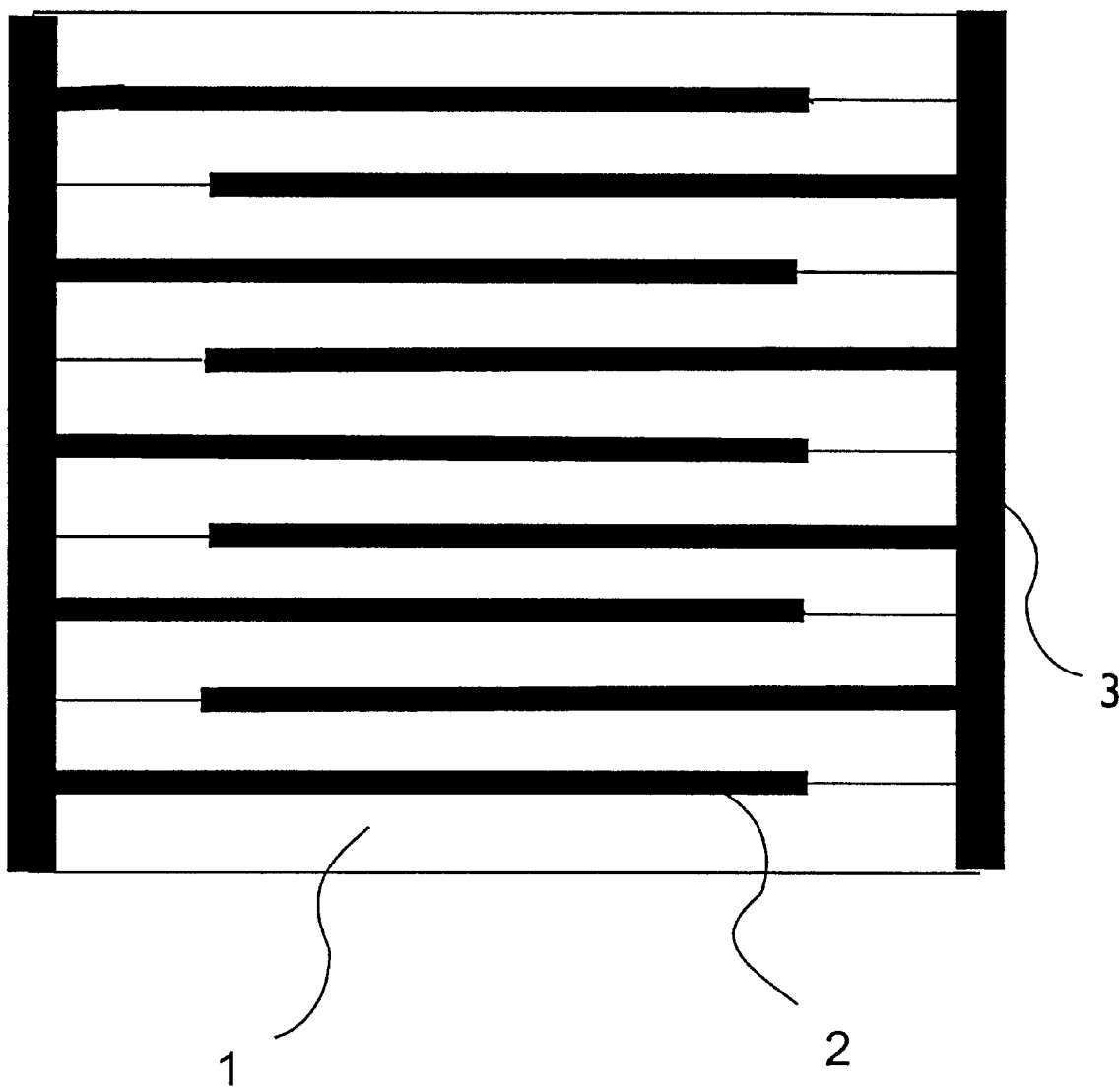

The invention relates to a ceramic capacitor comprising at least two electrodes and a ceramic dielectric of a dielectric, ceramic preparation, which is essentially composed of an oxide-ceramic dielectric substance and a sintering aid.

In ceramic capacitors, a ceramic material, i.e. an inorganic polycrystalline solid produced by firing at high temperatures, is used as the dielectric. Ceramic capacitors are available as disc capacitors, tubular capacitors and multilayer capacitors. With a view to miniaturization, in particular ceramic multilayer capacitors are important. Said capacitors are composed of a monolithic ceramic block into which electrodes are sintered in accordance with a comb-like pattern.

Ceramic multilayer capacitors are customarily manufactured by mixing, in a first step, the pulverized ceramic starting material for the ceramic dielectric with a water-containing binder preparation so as to form a pulpy suspension. This suspension is scraped on a belt conveyor so as to form a thin layer. As a result of evaporation of the solvent, a ceramic foil is formed which can be cut into sheets onto which electrodes can be printed by means of screen printing. After printing electrodes on said sheets, the sheets are disposed in layers so as to form stacks of 30 to 60 sheets. These stacks are cut into small cuboids, which are fired at temperatures in the range from 1000° C. to 1400° C. The contacts are manufactured, for example, by immersing in a metal-ceramic paste followed by a firing process.

The quality of multilayer capacitors is determined by the chemical composition of the material used for the ceramic dielectric and/or for the electrodes as well as by the process conditions. As regards the process conditions, particularly the sintering conditions are very important.

A plurality of inorganic binary and multiple oxides in different preparations are known as the ceramic dielectric materials for ceramic capacitors. For example, class 1 ceramic capacitors customarily contain a mixture of binary oxides of lanthanum and titanium, class 2 ceramic capacitors customarily contain a mixture of ferroelectric, titanium and zirconium-containing perovskites, and class 3 ceramic capacitors customarily contain polycrystalline barium titanates and strontium titanates.

In the sintering operation, various opposed oxidation and reduction reactions may take place in these binary or multiple oxides dependent upon the sintering atmosphere. If the sintering operation takes place in a reducing atmosphere, particularly titanium oxide and titanates may become semiconducting. In this semiconducting state, they cannot be used as a dielectric. However, sintering under oxidizing conditions can take place only if the electrode material consists of a non-oxidizable noble metal having a high melting point, such as rhodium, palladium or platinum. However, rhodium, palladium and platinum are very expensive; up to 50% of the cost of manufacturing a multilayer capacitor may be attributable to these noble metals. Therefore, there is a tendency towards replacing rhodium and platinum as the electrode metal by silver, copper or their alloys, which are much cheaper metals. Since the melting point of silver and copper is much lower, a sintering temperature is required that is much lower than the customary sintering temperature.

It is well known that the sintering temperature can be reduced by accelerating the extremely slow diffusion transport in the solid oxide phases. A substantial acceleration of the diffusion transport is achieved by the presence of liquid phases in the sintering process. Liquid-phase sintering requires sintering aids as additives, which form liquid phases whose melting point is as low as possible in order to obtain an effective reduction of the sintering temperature.

When use is made of sintering aids, it is also very important that the electrical properties of the ceramic dielectric material are not adversely affected by the additives. Sintering aids that are known to be used for liquid-phase sintering of perovskite phases are glass-forming mixtures of $CdO$—$ZnO$—$Bi_2O_3$—$PbO$—$B_2O_3$—$SiO_2$, as disclosed in U.S. Pat. No. 3,811,973

A drawback of boron oxide-containing sintering aids is, however, that during mixing the suspension, they react with the water-containing binding agent. The boron oxide hydrolyzes with the water from the binder preparation to boric acid $B(OH)_3$. The boric acid thus formed can react with the organic constituents of the binder preparation, thereby causing polymerizations in the binder. Polymerization of the binder causes the suspension to be destabilized. As a result, shaping of the green material is hampered and the electrical properties of the fired and sintered dielectric material are changed.

Therefore, it is an object of the invention to provide a ceramic capacitor comprising at least two electrodes and a ceramic dielectric of a dielectric, ceramic preparation, which is essentially composed of an oxide-ceramic dielectric substance and a sintering aid, which ceramic capacitor can be sintered at low temperatures and is characterized by reproducible dielectric properties.

In accordance with the invention, this object is achieved by a ceramic capacitor comprising at least two electrodes and a ceramic dielectric of a dielectric, ceramic preparation which is essentially composed of an oxide-ceramic dielectric substance and a sintering aid including zinc borate $Zn_4B_6O_{13}$. Such a capacitor can be sintered at low temperatures and hence can be provided, in particular as a multilayer capacitor, with base metal electrodes. A small quantity of the sintering aid is sufficient, so that the dielectric properties of the capacitor are hardly influenced. It is particularly advantageous that the zinc borate in the sintering aid does not react with water and the binder to undesirable by-products.

In accordance with a preferred embodiment of the invention, the oxide-ceramic dielectric material is a manganese-containing calcium-strontium-titanium zirconate of the general formula $(Ca_{1-x}Sr_x)_a[Zr_{1-y-z}Ti_yMn_z]O_3$, where $0.985 \leq a \leq 1.015$, $0 < x \leq 0.08$, $0 < y \leq 0.05$ and $0 < z \leq 0.02$. Apart from the very high temperature stability of $\epsilon_r$, such a capacitor is also characterized by low losses, so that it can suitably be used for applications wherein time-critical quantities are defined by means of capacitors such as time-function elements, oscillation circuits and filters.

It is particularly preferred that the oxide-ceramic dielectric material is a manganese-containing calcium-strontium-titanium zirconate of the general formula $(Ca_{0.937}Sr_{0.063})_a[Zr_{0.938}Ti_{0.040}Mn_{0.022}]O_3$.

In accordance with another embodiment of the invention, the sintering aid may additionally comprise a compound selected from the group formed by $CaO$, $CuO$, $SiO_2$, $CaSiO_3$, $ZnO$ and $ZnSiTiO_5$.

The invention also relates to a method of manufacturing a ceramic capacitor comprising at least two electrodes and a ceramic dielectric of a dielectric, ceramic preparation which is essentially composed of an oxide-ceramic dielectric material and a sintering aid including zinc borate $Zn_4B_6O_{13}$, by co-sintering said dielectric, ceramic preparation and the electrodes at a temperature in the range from 970° C. to 1050° C.

The invention further relates to a dielectric, ceramic preparation which is essentially composed of an oxide-ceramic dielectric material and a sintering aid comprising zinc borate $Zn_4B_6O_{13}$.

The dielectric ceramic preparation may be used for LTCC substrates ("Low Temperature Co-fired Ceramic") in integrated micromodules.

These and other aspects of the invention will be apparent from and elucidated by means of a drawing and three exemplary embodiments.

In the drawing:

FIG. 1 is a cross-sectional view of an embodiment of the capacitor in accordance with the invention. In this preferred embodiment, the capacitor in accordance with the invention is a multilayer capacitor.

A ceramic multilayer capacitor in accordance with the invention comprises a ceramic dielectric 1, which is composed of a plurality of oxide-ceramic dielectric layers having a thickness of maximally 50 μm, as well as a plurality of inner electrodes 2, which are arranged in the form of superposed layers in the dielectric and extend, alternately, to two opposite end faces of the dielectric. The end faces of the ceramic dielectric are provided with metallic contacts 3, which are used as outer terminals and are connected to the corresponding inner metallic electrodes.

To manufacture said capacitor use is made of the production technologies customarily used for ceramic capacitors, many variations in the manufacturing process being possible in dependence upon the desired shape and dimensions, the accuracy aimed at and the field of application.

The oxide-ceramic, dielectric material is a ceramic selected from the mixed crystal series of manganese-containing calcium-strontium-titanium zirconates of the general formula $(Ca_{1-x}Sr_x)_a[Zr_{1-y-z}Ti_yMn_z]O_3$, where $0.985 \leq a \leq 1.015$, $0 < x \leq 0.008$, $0 < y \leq 0.05$ and $0 < z \leq 0.02$. For the dielectric material use is preferably made of manganese-containing calcium-strontium-titanium zirconate of the composition $(Ca_{0.937}Sr_{0.063})_a[Zr_{0.938}Ti_{0.040}Mn_{0.022}]O_3$ The mixed crystal has the perovskite structure and a Curie point below room temperature.

The material satisfies the specification NP0 in accordance with DIN, i.e. the temperature coefficient $d\in/dT$ is below ±30 ppm/K between 25 and 85° C., and the loss factor tan δ is below $10^{-3}$. The material also satisfies the specification COG in accordance with the EIA-standard RS 198B, i.e. the temperature coefficient $d\in/\in dT$ is below ±30 ppm/K between −55 and 85° C.

The sintering aid comprises zinc borate $Zn_4B_6O_{13}$ (Boralith). The sintering aid may additionally comprise a compound selected from the group formed by CaO, CuO, $SiO_2$, $CaSiO_3$, ZnO and $ZnSiTiO_5$. The crystal lattice of zinc borate comprises a $B_6O_{12}$ backbone of interlinked $BO_4$ tetrahedrons, wherein the six boron atoms are situated at the corners of a distorted octahedron. The thirteenth oxygen atom is not integrated in the $B_6O_{12}$ backbone. Said thirteenth oxygen atom is tetrahedrally surrounded by 4 zinc atoms. Consequently, the compound $Zn_4B_6O_{13}$ can also be formulated as $OZn_4(B_6O_{12})$.

Zinc borate $Zn_4B_6O_{13}$ is prepared by mixing boron oxide $B_2O_3$ and zinc oxide ZnO in the molar ratio of 6:4 and firing said mixture at 950° C. for 2 hours. The complete conversion to zinc borate is checked by means of X-ray-photographic examinations. The fired zinc borate is ground so as to obtain an average grain size $d_{50}<0.5$ μm and subsequently washed. Also the average grain size of the compounds of the group formed by CaO, CuO, $CaSiO_3$, ZnO and $ZnSiTiO_5$ preferably is $d_{50}<0.5$ μm. $SiO_2$ is preferably used as a water-containing gel.

The material that can be selected for the electrodes is not subject to particular limitations, so that a metal or a combination of two or more customarily used metals can be employed. The electrodes may be composed of noble metals selected from platinum, palladium and gold. The electrodes may alternatively contain a base metal selected from the base metals chromium, zirconium, vanadium, zinc, tin, lead, manganese, molybdenum, tungsten, titanium, aluminum, nickel, iron, cobalt and their alloys. Preferably, the electrodes are made of an electrode metal selected from the group formed by silver, copper and their alloys.

To manufacture the dielectric, ceramic preparation use can be made of the methods customarily used to manufacture powders, for example the mixed-oxide method, co-precipitation, spray drying, sol-gel method, hydrothermal methods or alkoxide methods. Preferably, use is made of the mixed-oxide method, wherein the starting oxides or thermally decomposable compounds, such as carbonates, hydroxides, oxalates or acetates are mixed and ground. Subsequently, the starting powder is calcined at a temperature in the range from 1000° C. to 1400° C.

To shape said calcined powder so as to form the green body, use can also be made of all customary methods. In the case of ceramic multilayer capacitors, first a suspension is prepared from the calcined powder, which suspension comprises, apart from said powder, solvents, binding agents and optionally softeners and dispersing agents as further components. The solvent may be, for example, water, an alcohol, toluol, xylol or trichloroethylene. For the binder use is customarily made of organic polymers such as polyvinylalcohol, polyvinylbutyral or polymethylmethacrylate. For the softeners use can be made of glycerol, polyethylene oxide or phthalate. Furthermore, dispersing agents such as alkylarylpolyetheralcohols, polyethyleneglycolethylether or octylphenoxyethanol can be added to the suspension.

In accordance with a preferred method, green ceramic foils are manufactured from the suspension using a film-casting process. In said film-casting process, the suspension is poured onto a moving carrier surface. After evaporation of the solvent, a more or less flexible film remains, the flexibility being dependent on the binder system, which flexible film is cut, printed with a metal paste in accordance with the pattern of the inner electrodes using screen printing, and laminated. From the laminate, the individual multilayer capacitors are cut. These individual multilayer capacitors are first sintered in a slightly reducing atmosphere at temperatures ranging between 970 and 1050° C., after which they are tempered in a slightly oxidizing atmosphere at temperatures ranging between 600 and 800° C. For the slightly reducing atmosphere use can be made of water vapor-saturated nitrogen to which 0.5 to 2% by volume hydrogen is added, and for the slightly oxidizing atmosphere use can be made of nitrogen containing 5 ppm to 100 ppm oxygen.

The sintered, ceramic dielectric has a homogeneous microstructure with grain sizes below 5 μm.

To form the outer contact electrodes, a metal paste containing, for example, nickel is applied to the end faces of the capacitors and subjected to a firing process. The outer contacts may alternatively be provided by vapor deposition of a metal layer, for example of gold.

To characterize the capacitors in accordance with the invention, the dielectric constants $\in_r$ and the loss factor tan δ were measured in known manner at −60° C. to +130° C., at frequencies in the range from 100 kHz to 1 MHz, and a field strength of 1 Vac.

EXAMPLE 1

For the manufacture of a multilayer capacitor comprising a ceramic dielectric including 98.04 wt. % of the perovskite $(Ca_{0.975}Sr_{0.025})[Zr_{0.955}Ti_{0.022}Mn_{0.023}]O_3$ and 0.69 wt. % $Zn_4B_6O_{13}$, 0.84 wt. % ZnO, 0.16 wt. % $SiO_2$ and 0.27 wt. % CaO as the sintering agents, first the perovskite and the Boralith are separately prepared.

To prepare the perovskite, $SrCO_3$ ($d_{50}$=1.1 µm, BET:2.1 m²/g), $CaCO_3$ ($d_{50}$=0.8 µm), $TiO_2$ ($d_{50}$=0.48 µm, BET: 7 m²/g), $ZrO_2$ ($d_{50}$=0.12 µm, BET:21.9 m²/g) and $MnCO_3$ are mixed in the appropriate molar ratios and ground in a planet ball mill for two hours. For the grinding liquid use is made of cyclohexane, and for the grinding balls use is made of agate. Subsequently, said mixture is ground using 2 mm thick balls in isopropanol for 24 hours. After grinding in the planet ball mill, the mixture is dried under a surface evaporator in air and subsequently calcined at 1250° C. for 6 hours.

Zinc borate $Zn_4B_6O_{13}$ is prepared by mixing boron oxide $B_2O_3$ and zinc oxide ZnO in the molar ratio of 6:4, after which said mixture is fired at 950° C. for 2 hours. The complete conversion to zinc borate is checked by means of X-ray-photographic examinations. The fired zinc borate is ground to an average grain size $d_{50}$<0.5 µm and subsequently washed. An average grain size $d_{50}$<0.5 µm is also preferred for ZnO and $CaCO_3$ as the starting compound for CaO. $SiO_2$ is used as a water-containing gel.

The powdery material is mixed with polyvinylalcohol as the binding agent, and with a surface-active agent, a dispersing agent, triethyleneglycol as a softener, and water so as to form a slurry. Said slurry is processed in a doctor coater to form green ceramic films having a thickness of 50 µm.

The green film is cut into film cards, which are printed with a Cu paste in accordance with the pattern of the inner electrodes, stacked and pressed together and subsequently divided into individual capacitors of size 1206. The green capacitors are fired in air at a temperature in the range from 300 to 350° C., after which they are sintered at a temperature in the range from 1020 to 1050° C. in water vapor-saturated nitrogen to which <10 ppm oxygen (saturation temperature 20° C.) is added. The heating rate is 120° C./h, the residence time is 2 hours.

For the outer electrodes use is made of a vapor-deposited 6 nm thick CrNi layer coated with 0.15 µm Au.

Test results:
density 4.56 g/cm³=99.3%
dielectric properties measured at 1 MHz at temperatures ranging from −60° C. to +130° C.: $\in_r$ (20° C.):37, tan δ (20° C.):0.00288 and τ($\in_r$) (ppm/° C.): 24.

EXAMPLE 2

For the manufacture of a multilayer capacitor comprising a ceramic dielectric including 98.04 wt. % of the perovskite $(Ca_{0.975}Sr_{0.025})[Zr_{0.955}Ti_{0.022}Mn_{0.023}]O_3$ and 0.58 wt. % $Zn_4B_6O_{13}$, 0.70 wt. % ZnO and 0.19 wt. % $SiO_2$ as the sintering agents, first the perovskite and the Boralith are separately prepared.

To prepare the perovskite, $SrCO_3$ ($d_{50}$=1.1 µm, BET:2.1 m²/g), $CaCO_3$ ($d_{50}$=0.8 µm), $TiO_2$ ($d_{50}$=0.48 µm, BET: 7 m²/g), $ZrO_2$ ($d_{50}$=0.12 µm, BET: 21.9 m²/g) and $MnCO_3$ are mixed in the appropriate molar ratios and ground in a planet ball mill for two hours. For the grinding liquid use is made of cyclohexane, and for the grinding balls use is made of agate. Subsequently, said mixture is ground using 2 mm thick balls in isopropanol for 24 hours. After grinding in the planet ball mill, the mixture is dried under a surface evaporator in air and subsequently calcined at 1250° C. for 6 hours.

Zinc borate $Zn_4B_6O_{13}$ is prepared by mixing boron oxide $B_2O_3$ and zinc oxide ZnO in the molar ratio of 6:4, after which said mixture is fired at 950° C. for 2 hours. The complete conversion to zinc borate is checked by means of X-ray-photographic examinations. The fired zinc borate is ground to an average grain size $d_{50}$<0.5 µm and subsequently washed. ZnO is also preferably used with an average grain size $d_{50}$<0.5 µm, $SiO_2$ is used as a water-containing gel.

The powdery material is mixed with polyvinylalcohol as the binding agent, and with a surface-active agent, a dispersing agent, triethyleneglycol as a softener, and water so as to form a slurry. Said slurry is processed in a doctor coater to form green ceramic films having a thickness of 50 µm.

The green film is cut into film cards, which are printed with an AgPd10 paste in accordance with the pattern of the inner electrodes, stacked and pressed together and subsequently divided into individual capacitors of size 1206. The green capacitors are fired in air at a temperature in the range from 300 to 350° C., after which they are sintered in air at a temperature in the range from 1020 to 1050° C. The heating rate is 120° C./h, the residence time is 2 hours.

For the outer electrodes use is made of a vapor-deposited 6 nm thick CrNi layer coated with 0.15 µm Au.

EXAMPLE 3

For the manufacture of a multilayer capacitor comprising a ceramic dielectric including 99.01 wt. % of the perovskite $(Ca_{0.975}Sr_{0.025})[Zr_{0.955}Ti_{0.022}Mn_{0.023}]O_3$ and 0.41 wt. % $Zn_4B_6O_{13}$, 0.47 wt. % ZnO and 0.13 wt. % CuO as the sintering agents, first the perovskite and the Boralith are separately prepared.

To prepare the perovskite $SrCO_3$ ($d_{50}$=1.1 µm, BET:2.1 m²/g), $CaCO_3$ ($d_{50}$=0.8 µm), $TiO_2$ ($d_{50}$=0.48 µm, BET: 7 m²/g), $ZrO_2$ ($d_{50}$=0.12 µm, BET: 21.9 m²/g) and $MnCO_3$ are mixed in the appropriate molar ratios and ground in a planet ball mill for two hours. For the grinding liquid use is made of cyclohexane, and for the grinding balls use is made of agate. Subsequently, said mixture is ground using 2 mm thick balls in isopropanol for 24 hours. After grinding in the planet ball mill, the mixture is dried under a surface evaporator in air and subsequently calcined at 1250° C. for 6 hours.

Zinc borate $Zn_4B_6O_{13}$ is prepared by mixing boron oxide $B_2O_3$ and zinc oxide ZnO in the molar ratio of 6:4, after which said mixture is fired at 950° C. for 2 hours. The complete conversion to zinc borate is checked by means of X-ray-photographic examinations. The fired zinc borate is ground to an average grain size $d_{50}$<0.5 µm and subsequently washed. An average grain size $d_{50}$<0.5 µm is also preferred for ZnO and CuO.

The powdery material is mixed with polyvinylalcohol as the binding agent, and with a surface-active agent, a dispersing agent, triethyleneglycol as a softener, and water so as to form a slurry. Said slurry is processed in a doctor coater to form green ceramic films having a thickness of 50 µm.

The green film is cut into film cards, which are printed with an AgPd10 paste in accordance with the pattern of the inner electrodes, stacked and pressed together and subsequently divided into individual capacitors of size 1206. The green capacitors are fired in air at a temperature in the range from 300 to 350° C., after which they are sintered in air at a temperature in the range from 1020 to 1050° C. The heating rate is 120° C./h, the residence time is 2 hours.

For the outer electrodes use is made of a vapor-deposited 6 nm thick CrNi layer coated with 0.15 µm Au.

EXAMPLE 4

For the manufacture of a multilayer capacitor comprising a ceramic dielectric including 98.04 wt. % of the perovskite $(Ca_{0.975}Sr_{0.025})[Zr_{0.955}Ti_{0.022}Mn_{0.023}]O_3$ and 0.66 wt. % $Zn_4B_6O_{13}$, 0.16 wt. % CuO, 0.25 wt. % $SiO_2$ and 0.89 wt. % $ZnSiTiO_5$ as the sintering agents, first the perovskite and the Boralith are separately prepared. To prepare the perovskite, $SrCO_3$ ($d_{50}$=1.1 µm, BET: 2.1 $m^2$/g), $CaCO_3$ ($d_{50}$=0.8 µm), $TiO_2$ ($d_{50}$=0.48 µm, BET: 7 $m^2$/g), $ZrO_2$ ($d_{50}$=0.12 µm, BET: 21.9 $m^2$/g) and $MnCO_3$ are mixed in the appropriate molar ratios and ground in a planet ball mill for two hours. For the grinding liquid use is made of cyclohexane, and for the grinding balls use is made of agate. Subsequently, said mixture is ground using 2 mm thick balls in isopropanol for 24 hours. After grinding in the planet ball mill, the mixture is dried under a surface evaporator in air and subsequently calcined at 1250° C. for 6 hours.

Zinc borate $Zn_4B_6O_{13}$ is prepared by mixing boron oxide $B_2O_3$ and zinc oxide ZnO in the molar ratio of 6:4, after which said mixture is fired at 950° C. for 2 hours. The complete conversion to zinc borate is checked by means of X-ray-photographic examinations. The fired zinc borate is ground to an average grain size $d_{50}$<0.5 µm and subsequently washed. An average grain size $d_{50}$<0.5 µm is also preferred for CuO and $ZnSiTiO_5$. $SiO_2$ is used as a water-containing gel.

The powdery material is mixed with polyvinylalcohol as the binding agent, and with a surface-active agent, a dispersing agent, triethyleneglycol as a softener, and water so as to form a slurry. Said slurry is processed in a doctor coater to form green ceramic films having a thickness of 50 µm.

The green film is cut into film cards, which are printed with an AgPd10 paste in accordance with the pattern of the inner electrodes, stacked and pressed together and subsequently divided into individual capacitors of size 1206. The green capacitors are fired in air at a temperature in the range from 300 to 350° C., after which they are sintered in air at a temperature of 1010° C. The heating rate is 120° C./h, the residence time is 2 hours.

For the outer electrodes use is made of a vapor-deposited 6 nm thick CrNi layer coated with 0.15 µm Au.

Test results:

density 4.60 g/cm$^3$ dielectric properties measured at 1 MHz at temperatures ranging from −60° C. to +130° C.: $\in_r$ (20° C.): 37, tan δ (20° C.):0.0022 and τ($\in_r$) (ppm/° C.): 28 (−60 to +90° C.

What is claimed is:

1. A ceramic capacitor comprising at least two electrodes and a ceramic dielectric of a dielectric, ceramic preparation which is essentially composed of an oxide-ceramic dielectric substance and a sintering aid including zinc borate $Zn_4B_6O_{13}$.

2. A ceramic capacitor as claimed in claim 1, characterized in that the oxide-ceramic dielectric material is a manganese-containing calcium-strontium-titanium zirconate of the general formula $(Ca_{1-x}Sr_x)_a[Zr_{1-y-z}Ti_yMn_z]O_3$, where $0.985 \leq a \leq 1.015$, $0 < x \leq 0.08$, $0 < y \leq 0.05$ and $0 < z \leq 0.02$.

3. A ceramic capacitor as claimed in claim 1, characterized in that the oxide-ceramic dielectric material is a manganese-containing calcium-strontium-titanium zirconate of the general formula $(Ca_{0.937}Sr_{0.063})_a[Zr_{0.938}Ti_{0.040}Mn_{0.022}]O_3$.

4. A ceramic capacitor as claimed in claim 1, characterized in that the sintering aid additionally comprises a compound selected from the group formed by CaO, CuO, $SiO_2$, $CaSiO_3$, ZnO and $ZnSiTiO_5$.

5. A method of manufacturing a ceramic capacitor comprising at least two electrodes and a ceramic dielectric of a dielectric, ceramic preparation which is essentially composed of an oxide-ceramic dielectric material and a sintering aid including zinc borate $Zn_4B_6O_{13}$, by co-sintering said dielectric, ceramic preparation and the electrode at a temperature in the range from 970° C. to 1050° C.

6. A dielectric, ceramic preparation which is essentially composed of an oxide-ceramic dielectric material and a sintering aid comprising zinc borate $Zn_4B_6O_{13}$.

* * * * *